(12) United States Patent
Bouyssounouse et al.

(10) Patent No.: US 10,454,813 B2
(45) Date of Patent: Oct. 22, 2019

(54) SYSTEM AND METHOD FOR TRANSMITTING DATA

(71) Applicant: THALES, Courbevoie (FR)

(72) Inventors: Guy Bouyssounouse, Gennevilliers (FR); Frédéric Perez, Gennevilliers (FR); Michel Delattre, Gennevilliers (FR)

(73) Assignee: THALES, Courbevoie (FR)

( * ) Notice: Subject to any disclaimer, the term of this patent is extended or adjusted under 35 U.S.C. 154(b) by 167 days.

(21) Appl. No.: 15/598,115

(22) Filed: May 17, 2017

(65) Prior Publication Data

US 2017/0339045 A1   Nov. 23, 2017

(30) Foreign Application Priority Data

May 20, 2016   (FR) ...................................... 16 00810

(51) Int. Cl.
| H04L 12/761 | (2013.01) |
| H04L 12/715 | (2013.01) |
| H04L 12/805 | (2013.01) |
| H04L 12/811 | (2013.01) |
| H04W 72/00 | (2009.01) |
| H04W 4/06 | (2009.01) |
| H04W 88/04 | (2009.01) |

(52) U.S. Cl.
CPC ............. *H04L 45/16* (2013.01); *H04L 45/04* (2013.01); *H04L 47/365* (2013.01); *H04L 47/38* (2013.01); *H04W 4/06* (2013.01); *H04W 72/005* (2013.01); *H04W 88/04* (2013.01)

(58) Field of Classification Search
CPC ....... H04L 45/16; H04L 47/38; H04L 47/365; H04L 45/04; H04W 4/06; H04W 72/005; H04W 88/04; H04W 88/085
See application file for complete search history.

(56) References Cited

U.S. PATENT DOCUMENTS

| 8,719,657 B2 * | 5/2014 | Yi ...................... H03M 13/356 |
| | | 714/755 |
| 9,537,759 B2 * | 1/2017 | Calmon ............. H04B 7/15521 |
| 9,860,022 B2 * | 1/2018 | Krigslund ............. H04W 40/02 |
| 10,028,198 B2 * | 7/2018 | Fitzek ................. H04L 12/6418 |
| 2010/0094963 A1 | 4/2010 | Zuckerman et al. |
| 2012/0182860 A1 * | 7/2012 | Liu ..................... H04L 12/1863 |
| | | 370/216 |

(Continued)

FOREIGN PATENT DOCUMENTS

| WO | 2007/085763 A1 | 8/2007 |
| WO | 2011/043755 A1 | 4/2011 |
| WO | 2016/022982 A1 | 2/2016 |

*Primary Examiner* — Oussama Roudani
(74) *Attorney, Agent, or Firm* — Baker & Hostetler LLP

(57) ABSTRACT

A method and a system are provided implementing a mechanism for relaying by all the nodes, on all the networks and sub-networks connected and defined by the routing directive: as soon as a number of cells "n" of different index have been received, whatever the sender thereof, making it possible to reconstruct the message and until, on each of the sub-networks, a predefined number of cells of different index has been sent or received. The relaying comprises decoding the message received and recoding it by a sequence of the unique fountain code on each sending of the same message whatever the relay node.

8 Claims, 10 Drawing Sheets

(56) References Cited

U.S. PATENT DOCUMENTS

2014/0369253 A1* 12/2014 Jose .................... H04W 28/065
370/315
2017/0230144 A1* 8/2017 Wu ................... H03M 13/3761

* cited by examiner

SYSTEM AND METHOD FOR TRANSMITTING DATA

CROSS-REFERENCE TO RELATED APPLICATIONS

This application claims priority to foreign French patent application No. FR 1600810, filed on May 20, 2016, the disclosure of which is incorporated by reference in its entirety.

FIELD OF THE INVENTION

The invention relates to a method and a system for transmitting data in a communication system that may comprise different nature networks.

BACKGROUND

In the subsequent description the expression "heterogeneous network" designates a network in which the transmission elements can be radio sets, satellites, etc.

In certain telecommunication applications, messages are transmitted to several recipients via heterogeneous networks (radio, satellites, etc.) while adapting to the terrain conditions (obstacles, propagation, movements of the nodes of the network) and while allowing robust and globally efficient service provision. Global efficiency is intended to mean a good ratio between the volume of information correctly transmitted and the spectral resources consumed. This is in particular manifested through:
  utilization of the broadcasting capabilities of the medium,
  minimization of the monitoring information (overhead and protocol exchanges).

The data transmission must also show its efficiency taking account in particular of the constraints listed hereinbelow:
  the fluctuations of the transmission conditions are often much faster than the transmission delay of a message, messages of significant size, reduced bandwidth. The global efficiency is therefore also conditioned by the overhead of taking these changes into account, even for the already partially transmitted messages;
  a message must be delivered within an allowed delay, whatever the recipient of the message. If reaching certain recipients makes it impossible to keep to this timescale, for example subsequent to degraded transmission conditions, this must not have any impact or must have little impact on delivery to the recipients for which the transmission conditions are nominal.

The NORM protocol known to the person skilled in the art (standing for "Nack-oriented reliable multicast"), RFC 5740, is used for point-to-multipoint data transmission. This NORM protocol adapts the volume of information to be transmitted or retransmitted as a function of the feedback of the receivers, through the use of negative acknowledgements.

The protocol known by the abbreviation PGM (Pragmatic Group Multicast) is a protocol for reliable multicast broadcasting of information generated automatically, in real time, between several sources and several receivers. It proposes data transmission of enhanced reliability in a tree monitored by a transmission window managed by the sender. It is addressed to applications that are insensitive to losses that are not corrected by the protocol. Indeed, only the information detected by the receivers as being lost is signaled, by negative acknowledgement. The sender is never certain that the receiver has received the entire message.

Patent application EP1989822 discloses multipoint transmission of enhanced reliability between a sender and several recipients. The reliability of the transmission is enhanced by introducing a server and point-to-point communications between the recipients in case of losses.

Other data transmission protocols such as network coding or random linear network coding known by the abbreviation RLNC (Random Linear Network Coding) are also known from the prior art.

Despite the advantages that they afford, most methods known from the prior art exhibit drawbacks in the deployments of heterogeneous networks. The methods of the prior art do not minimize the overheads related to the needless transmission of information, the useful information transmitted already being in the possession of the receiver or the volumes of monitoring information becoming significant relative to those of the information useful to the recipients.

The prior art does not address the problematic issue of forwarding on heterogeneous networks in multi-hop mode.

The Intra-stream "Network Coding" approach affords a noticeable improvement in resilience. The aforementioned RLNC approach consists of the random generation of the coding factors. Nonetheless, this approach exhibits the following drawbacks:
  The probability of generating linearly dependent sequences is non-zero, redundant data are then sent needlessly over the medium, (non-deterministic code),
  The necessity of transmitting the sequence's coding factors so as to allow its decoding, this incurring a resource consumption overhead,
  The principles of partial recoding at the level of the relays, based on a partially received item of information which at this stage is undecodable, make it possible to generate only sequences that are linearly dependent on those already sent. This increases the probability of finding, at the destination, linearly dependent sequences and therefore of having sent needless information,
  RLNC requires the use of end-to-end signaling making it possible to monitor the transmission when the recipient has received sufficient data for the decoding.

SUMMARY OF THE INVENTION

The present invention proposes a communication method and system for exchanging messages within a group via broadcasting networks based in particular on:
  Forwarding of messages hop by hop on a set of adjoining and broadcasting media by using routing directives associated with the message,
  A media-independent message coding procedure used on each "relaying" of the message,
  Optimal transmission on each medium by cutting the message into segments of size adapted for the characteristics of the medium (transmission time, error rate, etc.),
  A criterion for stopping the broadcasting of the message, making it possible to minimize the information transmitted needlessly on each broadcasting medium.

In the subsequent description, the following definitions will be employed:
  The word "group" designates the source of a message and the set of recipients of this message, a recipient being able to be a computer application executing on a terminal or a server linked to the heterogeneous network by way of transmission nodes, The word "group of nodes" designates the set of the source and recipient nodes to which the group is attached, The word "relay node" designates a transmission node that can receive the information from one sub-network and relay it onto another sub-network, the relay node can be one of the nodes of the group but also any other node attached to the broadcasting medium, The expression "broadcasting medium" or "broadcasting sub-network" designates a sub-network in which each linked node can receive an item of information sent by one of the nodes without there being a process of n-plication of the item of information, The word "cell" represents a coded fragment of information of fixed size of a message, The word "index" designates a positive integer which represents the order number of a cell produced by a fountain code; it makes it possible to reference this coded cell during reconstruction of a message, The word "segment" represents a coded fragment of variable size of a message, it consists of a concatenation of cells, The expression "fountain code" is defined further on in the description, The expression "assumption of nominal reception" in a sub-network implies that any item of information sent on the sub-network is received by all the nodes of the sub-network that are concerned by the transmission, relay nodes and recipient nodes.

The method implements a mechanism of relaying by all the nodes, on all the networks and sub-networks connected and defined by the routing directive:

As soon as a number of cells "n" having a different index have been received, whatever the sender thereof, making it possible to reconstruct the message.

Until, on each of the sub-networks, a predefined number of cells of different index has been sent or received.

The relaying consists notably in decoding the message received and in recoding it by a sequence of the unique fountain code on each sending of the same message whatever relay node and sub-network are designated by the routing directive.

This relaying mechanism can be improved, on a case by case basis, per type of message or per type of sub-network traversed, by controlling the transmission of the senders (relay nodes or source node) through a monitoring item of information going from the receiver nodes (relay nodes or recipient nodes) to the sender nodes that are directly reachable through a sub-network. This monitoring item of information will allow better regulation of the load and will make it possible to manage situations of high error rates. This improvement can be implemented when the message routing directive constrains the possible paths to a small number of relay nodes, the relay receiver nodes then play a determining role in load regulation and error detection.

The invention relates to a method for transmitting a message M sent by a source node within a group of nodes each linked to one or more broadcasting sub-networks, at least one relay node between these broadcasting sub-networks and a routing protocol, a message consisting of n cells and comprising several cells and information specific to the routing in which:

At the Level of the Source Node choosing a coding of the cells of a message M and of the information specific to the routing, by the source node by using a fountain code adapted for generating n+k cells, so as to constitute p ranges of x cells, with x greater than or equal to n, a cell being tagged by an index in the message, as a function of routing directives and of its identifier IDn, the source node determines the ranges of x cells to be used to code the message before the sending to the relay node or nodes or to the recipient node or nodes, the source node groups together the cells to be transmitted into several segments, a segment comprises a number Ns of coded cells and the source node inserts before each segment a header comprising at least the following information: an item of information making it possible to deduce the index of each cell contained in the segment, an identifier specific to the message to be transmitted and its size, sending at least one first string of segments $\{S_{11}(M), \ldots, S_{1k}(M)\}$ of the message M via a first transmission path and at least one second string of segments $\{S_{21}(M), \ldots, S_{21}(M)\}$ of the message M via a second transmission path, At the Level of a Relay Node the relay node keeps count per message M and per sub-network SR of the cells of different indices that it sends and that it receives from the other nodes of the sub-network, on the basis of the message identifier contained in the segment header, as soon as the relay node has at its disposal a number of cells of different indices corresponding to the size of the message M, it reconstructs this message, as a function of the routing directives contained in the reconstructed message and of its node identifier IDn, the relay node determines the ranges of x cells to be used to recode the message before the sending to the other relay nodes or to the other recipient nodes, and sends on each sub-network a maximum number of cells while taking account of the cells that it has already received on this sub-network, the relay node stops its sending on the sub-network SR as soon as the number of cells of different indices received and sent on the sub-network makes it possible to reconstruct the message from the other nodes of the sub-network under the assumption of nominal reception, the recipient nodes belonging to the group of linked nodes and which are not relay nodes reconstruct the message on the basis of segments received from the sub-networks to which they are attached before delivering the message.

The method uses, for example, as coding algorithm for the cells an algebraic code.

According to a variant, the number of cells is chosen as a function of the characteristics of the message transmission sub-network.

According to another variant, the number of cells to be transmitted on a sub-network corresponds to the number adapted for the error rate of the transmission sub-network.

The method uses, for example, a function for allocating range of cells to be sent which is adapted for allocating a different range to each (node, sub-network) pair, the sub-networks to be considered being the sub-networks of the routing directive.

The controlling of the transmission of the segments takes account, for example, of a reception state item of information delivered by the receivers.

According to a variant, the transmission of the data is carried out by high-frequency transmission and/or very-high-frequency transmission and/or all IP network transmission.

The invention also relates to a system for relaying one or more messages within a network comprising several nodes communicating with one another by means of a broadcasting medium, and belonging to a group G, characterized in that it comprises at least the following elements:

a source node of message M to be transmitted on several paths corresponding to at least two sub-networks, the said source node comprising at least one processor adapted for executing the steps of the method according to the invention, an algorithm for coding the data of the message M to be transmitted, one or more relay nodes each comprising a sender, a receiver, a coding/decoding algorithm for the message M identical to the algorithm for coding the source node, a counter of the cells contained in the coded message that are sent and received per forwarding path of the message M, the coding/decoding algorithm being adapted for the recombining of elements transmitted on various sub-networks, a receiver adapted for receiving the message sent by the source node, a processor adapted for reconstructing the message M, for recoding it on the basis of the information and for transmitting it to a recipient node and for stopping the sending as soon as the number of cells of different indices received and sent on the sub-network makes it possible to reconstruct the message from the other nodes of the sub-network under the assumption of nominal reception.

BRIEF DESCRIPTION OF THE DRAWINGS

Other characteristics and advantages of the present invention will be better apparent on reading the description which follows with exemplary embodiments given by way of wholly nonlimiting illustration, together with the figures which represent.

DETAILED DESCRIPTION

Figure 1:
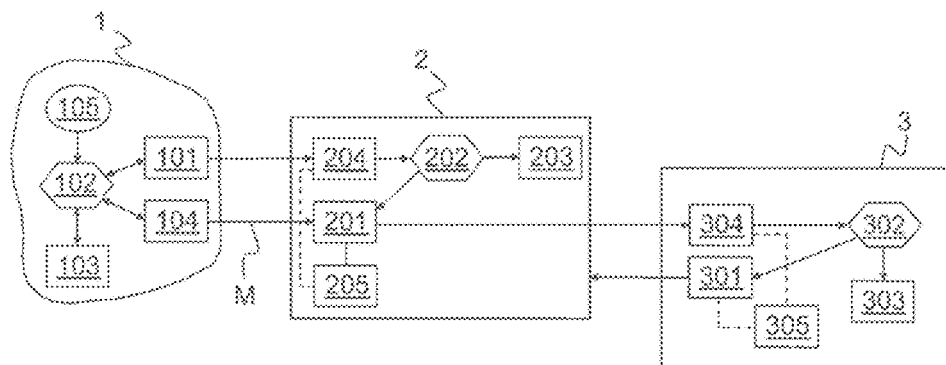
FIG. 1, an exemplary network in which the method according to the invention can be implemented, FIG. 2, a scheme for coding a message to be transmitted, FIG. 3, a flowchart listing the main steps of the method according to the invention, FIG. 4, a first exemplary network topology, FIGS. 5, 6, 7 and 8, numerical examples of the implementation of the method according to the invention in the network of topology of FIG. 4, FIG. 9, a second exemplary network topology, and FIGS. 10, 11 numerical examples of the implementation of the method according to the invention in the network of topology of FIG. 9.

FIG. 1 represents a basic example in the case of a network comprising a message source, a relay node, two sub-networks for the transmission of the message, a recipient node.

A sub-network can be a SATCOM network, a terrestrial wireless infrastructure network, an ad hoc wireless network, an IP multicast group over any technology.

The source of messages is, for example, a node of the system which seeks to transmit a message M to one or more recipient nodes belonging to a group. The segmented message is forwarded on several paths corresponding to sub-networks, at least two, hop by hop. The message is identified by a unique reference in the network to a group of receivers.

The source node 1 comprises, for example, a sender 101, a processor 102 adapted for executing the steps of the method according to the invention, a coding algorithm module 103 for coding the data to be transmitted, optionally a receiver 104, a counter 105 of the cells sent and received per forwarding path of the message M. The coding algorithm is based on a fountain code common to the source and to all the relays guaranteeing the linear independence of all the resulting segments.

The relay node 2 comprises for example a sender 201, a processor 202, a receiver 204 adapted for receiving the message sent by the source node, a coding, decoding, algorithm module 203 identical to the module 103, a counter 205 of the cells sent and received per forwarding path of the message M. The relay node is associated with two sub-networks which correspond to two transmission paths.

The recipient node 3 comprises for example a receiver 304 of the message, a decoding algorithm module 303 making it possible to reconstruct the message, a sender 301 and a processor 302 executing the steps of the method according to the invention, a counter 305 for keeping count of the cells sent and received per forwarding path of the message M.

The method relying on a broadcasting medium, one node of a sub-network is listening for the sends of the other nodes of a sub-network and also receives the cells sent by the other nodes of the sub-network.

The method according to the invention implements an algebraic coding, which is common to all the nodes sending a message M, for example, the source node, a relay node or any other element of the system comprising this message sending functionality.

In the coding used, the size of a cell is fixed and corresponds to a configuration parameter. A message consists of a number of cells (size of the message=n*size of the cell), the cells making it possible to reconstruct a message. The algebraic code will generate n+k cells, k being chosen very large (pseudo-fountain code). Any other code exhibiting similar characteristics could be used.

Each cell Ci is numbered by an integer, the index of the cell, going from 1 to n+k. As soon as a node receives n cells of different index, the complete message can be reconstructed.

The set of cells is structured into ranges of size x of contiguous cells, with x greater than or equal to n, thereby making it possible to introduce redundancy within one and the same range and to cover the case of the sub-network exhibiting the largest error rate. Thus, the range p1 comprises, for example, the cells C1, . . . , Cx, the range p2 the cells Cx+1, . . . , C2x, etc.

There is redundancy of information as soon as a number of cells greater than n cells have been sent, n corresponding to the initially fixed number of cells and to the minimum number of cells allowing reconstruction of the complete message. For example, (1, 1*n) cells are considered for a sub-network with an error rate of 10%. The purpose of the redundancy of information within a range is to compensate the estimated losses of cells during the transmission of the message on a sub-network.

Such a structuring makes it possible to guarantee that one and the same cell is never sent several times, whatever the sender and the sub-network, by allotting a different range of cell to be sent for each (sender, sub-network) pair on the data path.

The number of senders (the source plus the relays) multiplied by the number of sub-networks of the routing directive defines the number of ranges of cells and therefore of cells to be used.

When a source node or a relay node must send on a sub-network SR, it selects a range pi of cells and determines the number of cells to be sent in this range pi as a function in particular of the characteristics of the sub-network. The characteristics of a sub-network are, for example, the error rate of the sub-network. For example, for a lossless sub-network, the number of cells to be sent will be the number n, for a sub-network with very large loss rate, the number of cells to be sent will correspond to the value of x, for example.

Figure 2:
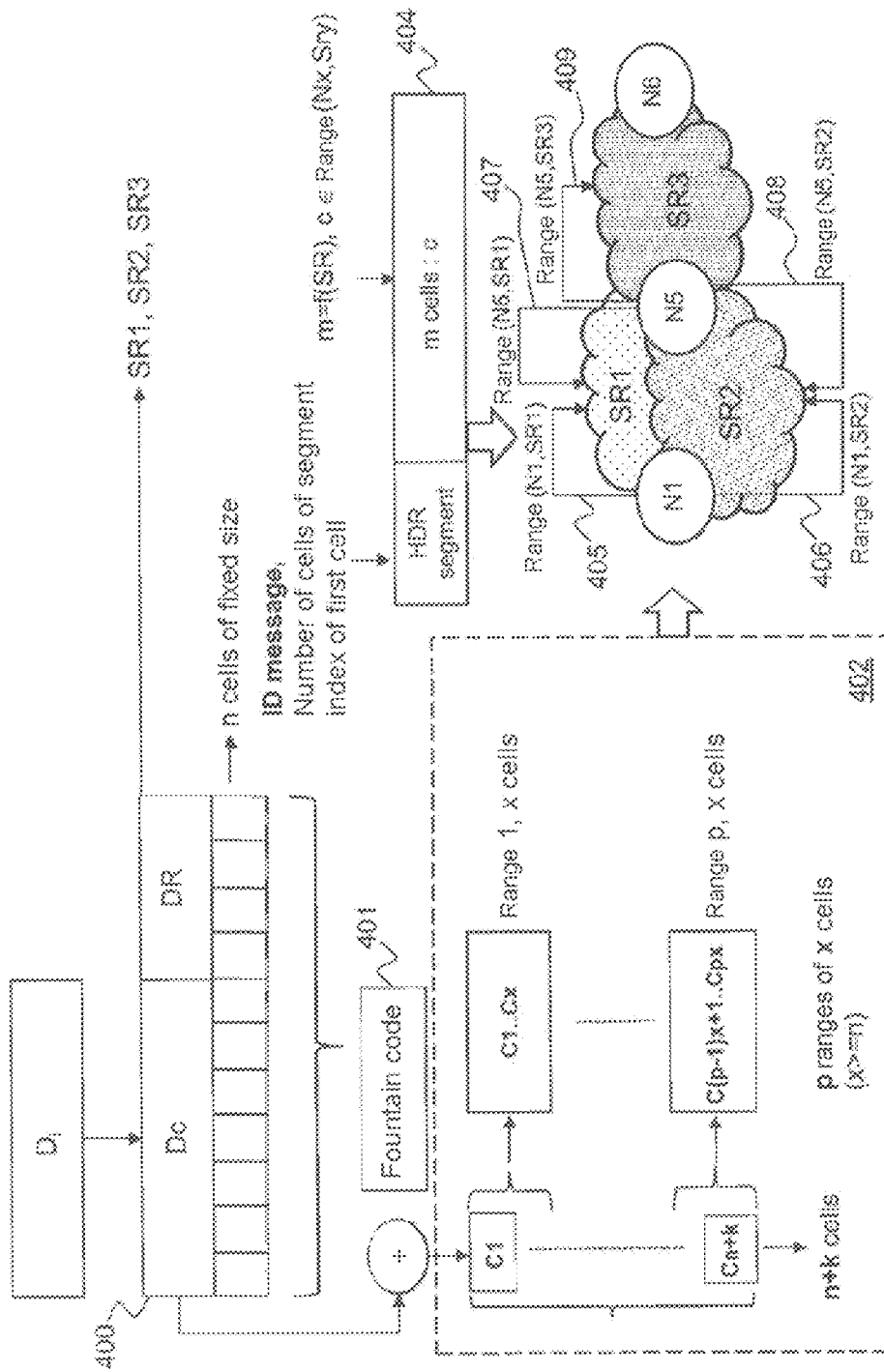

FIG. 2 illustrates the generic construction of a message M with an identifier ID and its transmission in a group G to which several nodes of the network belong, one of which is the source node.

To the data Di of the message M are added the routing directives DR, containing all the information making it possible to reach all the nodes of the group G, 400.

To the set thus formed, a fountain code is applied, 401. The fountain code comprises n+k cells, and p ranges of x cells will be constructed, with x greater than n, so as to ensure the necessary redundancy. On completion of the coding step, p ranges of x cells are obtained, constructed for example in the following manner, 402:

Range 1, p1, x cells, C1, ... Cx,
...
Range p, x cells, C(p−1)x+1, ..., Cpx.

The data are for example transmitted in segments S consisting of a segment identifier HDR, of m cells c, 404. The number of cells of the segment m is a function of the sub-network, m=f(SR), the cells c are chosen in a different range for each pair (Nx, SRy) with x the index of the node and y the index of the sub-network.

The use of different ranges per sender node and sub-network makes it possible to optimize transmission by guaranteeing the reconstruction of the message as soon as n cells have been received, whatever the cells received, since any receiver always receives cells of different indices.

In FIG. 2, the node N1 sends cells of the range (N1, SR1) via the sub-network SR1, 405 and cells of the range (N1, SR2) 406 via the sub-network SR2.

The node N5 sends cells of the range (N5, SR1) via the sub-network SR1, 407, and cells of the range (N5, SR2) via the sub-network SR2 408, and cells of the range (N5, SR2) via the sub-network SR3, cells of the range (N5, SR3) via the sub-network SR3, 409.

Before giving numerical examples to better elucidate the method according to the invention, the method is illustrated in a generic manner.

For the sending of the cells, the source node will, for example, group together the cells to be transmitted by grouping them by segment S. A segment comprises a number m of coded cells. The source node inserts before each segment S a header comprising at least the following information: the serial number of the first cell of the segment, the number of cells contained in the segment, an identifier specific to the message M to be transmitted. The source node will thus send a first string of segments $\{S_{11}(M), \ldots, S_{1k}(M)\}$ of the message M via the first transmission path and a second string of segments $\{S_{21}(M), \ldots, S_{21}(M)\}$ of the message M via the second transmission path. The ranges of cells to be used to code the message before the sending are determined in particular as a function of the routing directives.

The relay node receives, for example, the first string of segments $\{S_{11}(M), \ldots, S_{1k}(M)\}$ and the second string of segments $\{S_{21}(M), \ldots, S_{21}(M)\}$. Each of these segments comprises a number Ns of coded cells Cj. The relay node keeps count, per message M and per forwarding sub-network DR, of the cells that it sends and that it receives (sent by the other nodes of the sub-network). The node keeps count of the cells associated with a given message, on the basis of the message identifier contained in a segment. As soon as the relay node has at its disposal a number of cells equal to the number of cells making it possible to reconstruct the message M, corresponding to the sum of the cells of the message received from all the sub-networks, it reconstructs this message.

As a function of the routing directives contained in the message M received and of its node identifier, the relay node determines the ranges to be used to send the message to other relay nodes or to other recipients. Accordingly, it will, for example, select a range which is available at the level of the coded cells and which has not been used by another node, the range number p, (with p=node identifier*number of routing directives+order number of the sub-network in the routing directive) to send the message M on the sub-network SR indicated in the routing directive. The relay node sends at the most a number between n and x of cells as a function of the characteristics of the sub-network SR. The relay node stops its sending as soon as the sum of the cells received and sent on the sub-network is equal to the number between n and x of cells, which number is adapted for the error rate of the transmission sub-network.

To have at its disposal the number of cells received per sub-network, the relay node listens to the message sends from the other nodes on the sub-networks to which it is connected.

The method for transmitting a message M sent by a source node within a group G of nodes each linked to one or more broadcasting sub-networks, by using one or more relay nodes between these sub-networks, comprises the steps described hereinafter and illustrated in FIG. 3:

At the Level of the Source Node
- the choice of a coding and the coding of the cells of the message M and of the information DR specific to the routing, by the source node by using an algebraic code adapted to generate n+k cells, the number of coded cells being dependent on the characteristics of a sub-network SR which will be used to transmit the data of the message, 410,
- as a function of the routing directives and of its identifier IDn, the source node determines the ranges of x cells to be used to code the message before the sending to the relay node or nodes and to the recipient node or nodes, 410b,
- the source node groups together the cells to be transmitted into several segments S, a segment comprises a number m of coded cells belonging to the coding range, range (Nx,SRy). The source node inserts before each segment a header HDR comprising at least the following information: an item of information making it possible to deduce the index of each cell contained in the segment, for example, the serial number i of the first cell of the segment, the number of cells contained in the segment, an identifier specific to the message to be transmitted and its size, 411,
- sending of at least one first string of segments $\{S_{11}(M), \ldots, S_{1k}(M)\}$ of the message M via a first transmission path and of a second string of segments {$S_{21}(M)$ $S_{21}(M)$} of the message M via a second transmission path, 412, At the Level of a Relay Node the relay node keeps count, per message M and per sub-network SR, of the cells of different indices that it sends and that it receives from the other nodes of the sub-network, on the basis of the identifier of the message contained in the segment header, 413, as soon as the relay node has at its disposal a number of cells equal to the number of cells of different indices, whatever the provenance (SR) of the cells, corresponding to the size of the message M, it reconstructs this message, 414, as a function of the routing directives DR contained in the reconstructed message M and of its node identifier IDn, the relay node determines the ranges pi to be used to recode the message before sending it to the other relay nodes or to the other recipients, and the relay node sends on each sub-network SR a maximum number between n and x of cells while taking account of the cells that it has already received on this sub-network SR, 415, the relay node stops its sending on the sub-network SR as soon as the number of the cells of different indices received and sent on the sub-network SR makes it possible to reconstruct the message from the other nodes of the sub-network SR under the assumption of nominal reception, 416, as was defined hereinabove.

The recipient nodes belonging to the group G and which are not relay nodes make do with reconstructing the message on the basis of the segments received from the sub-networks to which they are attached so as to deliver the message to the recipient applications.

The numerical examples which follow are given by way of illustration so as to illustrate the implementation of the method according to the invention and are illustrated by tables in the figures.

Figure 4:
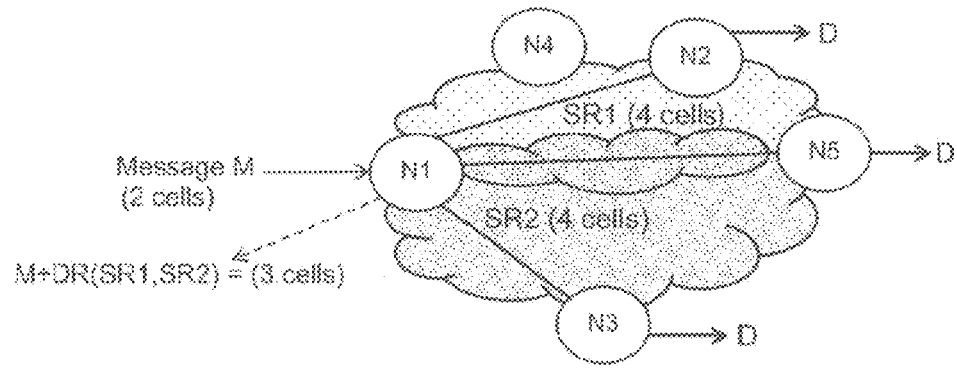

FIG. 4 shows diagrammatically a network topology which will serve as the basis for various exemplary embodiments. The node N1 will send a message M (2 cells) to the recipient nodes N2, N3 and N5 belonging to the group G and the source node N1 also. The node N4 is not a recipient but it too will also receive the message which it will not process. A routing directive indicating that the sub-networks SR1 and SR2 are used to transmit the message, the set M+DR(SR1, SR2)=(3 cells) contains three cells. In order to reconstruct the message M, the nodes belonging to the group G must have three cells at their disposal. An additional cell will be transmitted both on SR1 and SR2 so as to compensate for possible losses (this representing a total of four cells on SR1 and SR2). The cells are transmitted in groups of two on SR1 (segment containing two cells) and individually on SR2 (segment containing a single cell).

For example, an example of numerical data is the following:

Message Size=20 bytes,

Routing directive=SR1, SR2, the message will be transmitted via the sub-networks SR1 and SR2, Routing directive Size=10 bytes, Number of cells per segment: two for SR1, one for SR2, Cell size=10 bytes, four cells Range (SR1), four cells Range (SR2), x=4 cells per range, Ranges used for the coding of the cells: p(N1,SR1)=1, p(N1,SR2)=2, p(N3,SR1)=5, p(N3,SR2)=6, p(N5,SR1)=9, p(N5,SR2)=10.

An exemplary range allocation function is the following f(node, sub-network)=(nodeNo.−1)*Number of sub-networks of the routing directive+position of the sub-network in the routing directive.

Figure 5:
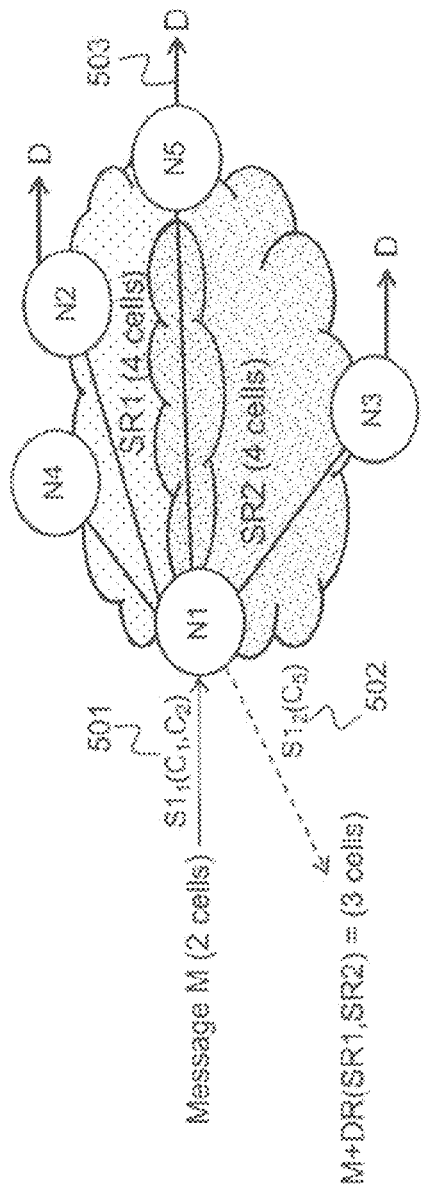

The example which follows, illustrated in FIG. 5, allows the decrease in the multi-path latency. A multi-linked recipient profits from the information received from the set of sub-networks to which it is linked:

N1 sends the segment $S1_1(C_1, C_2,)$ on the sub-network SR1, the nodes N2, N4, N5 receive, 501, N1 sends the segment $S1_2(C_5)$ on the sub-network SR2, the nodes N3, N5 receive, 502, N5 returns the message to the recipient (it has at least three cells), 503, N5 utilizes the cells received via the sub-network SR1 and the sub-network SR2 and reconstructs the message as soon as it counts three cells (gain in latency), 504, N1 sends two more cells of different indices from the cells already sent on the sub-network SR1, all the nodes receive, 505, N1 sends three more cells of different indices from the cells already sent on the sub-network SR2, all the nodes receive, 506, N4 sends a cell on the sub-network SR2 so as to total four cells on the sub-network SR2, all the nodes receive, 507.

Figure 6:
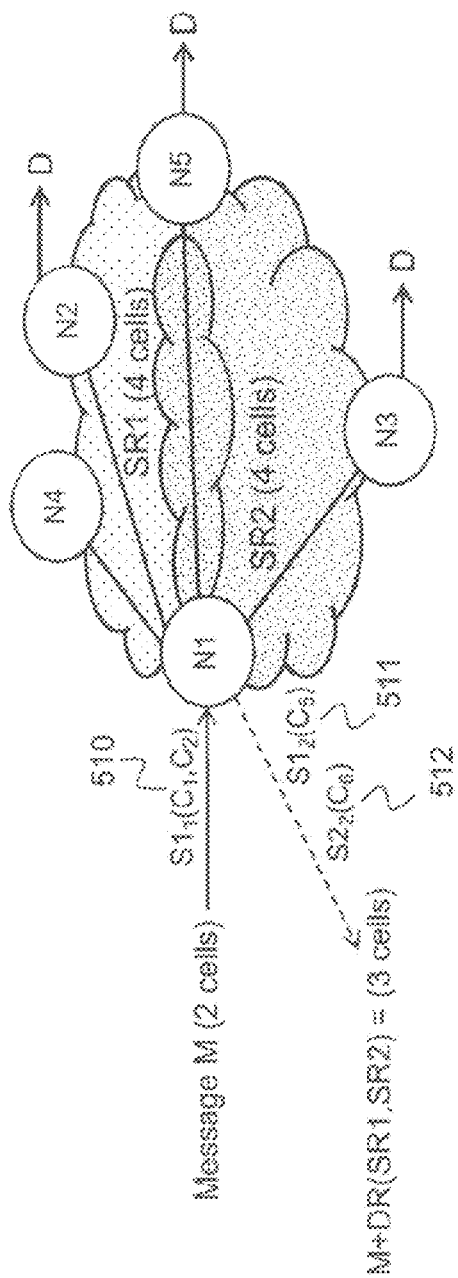

The following example illustrated in FIG. 6 allows compensation of multi-path losses. The information lost via a sub-network is compensated by that received from the other sub-networks:

N1 sends the segment $S1_1(C_1, C_2)$ on the sub-network SR1, the nodes N2, N4, N5 receive, 510, N1 sends the segment $S1_2(C_5)$ on the sub-network SR2, the segment is lost (not received by the nodes N3, N5), 511, N1 sends $S2_2(C_6)$ on the sub-network SR2, the nodes N3, N5 receive, 512, N5 returns the message to the recipient (it has received at least three cells), The loss of the cell C5 on the sub-network SR2 is compensated by the cells received from the sub-network SR1, (faster correction of losses), N1 sends two more cells on the sub-network SR1, all the nodes receive, 513, N1 sends two more cells on the sub-network SR2, all the nodes receive, 514

N5 sends a cell on the sub-network SR2 so as to total four cells on the sub-network SR2, all the nodes of the group G receive, 515.

Figure 7:
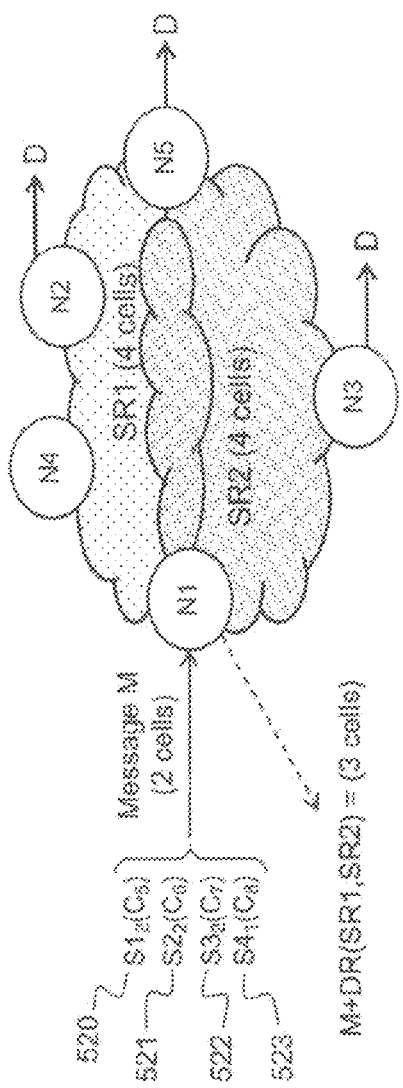

The example of FIG. 7 relates to the compensation of different losses by one and the same item of information. A single transmitted item of information can compensate various losses:

The nodes N2 and N4 are not accessible, sending to the nodes N3, N5 on the sub-network SR2 only, N1 sends the segment $S1_2(C_5)$ on the sub-network SR2, N3,N5, 520, N1 sends the segment $S2_2(C_6)$ on the sub-network SR2, received by N3, 521, N1 sends the segment $S3_2(C_7)$ on the sub-network SR2, received by N5, 522, N1 sends the segment $S4_2(C_8)$ on the sub-network SR2, received by the nodes N3, N5, 523, C8 compensates the loss of the cell C6 by the node N5 and of the cell C7 by the node N3, The nodes N3 and N5 total three cells of different indices and can therefore deliver the message to the recipient, 524, The node N3 sends a cell on the sub-network SR2 so as to total four cells on the sub-network SR2, the cell is lost, 525, The node N5 sends a cell on the sub-network SR2 so as to total four cells on the sub-network SR2, the cell is lost, 526.

Figure 3:
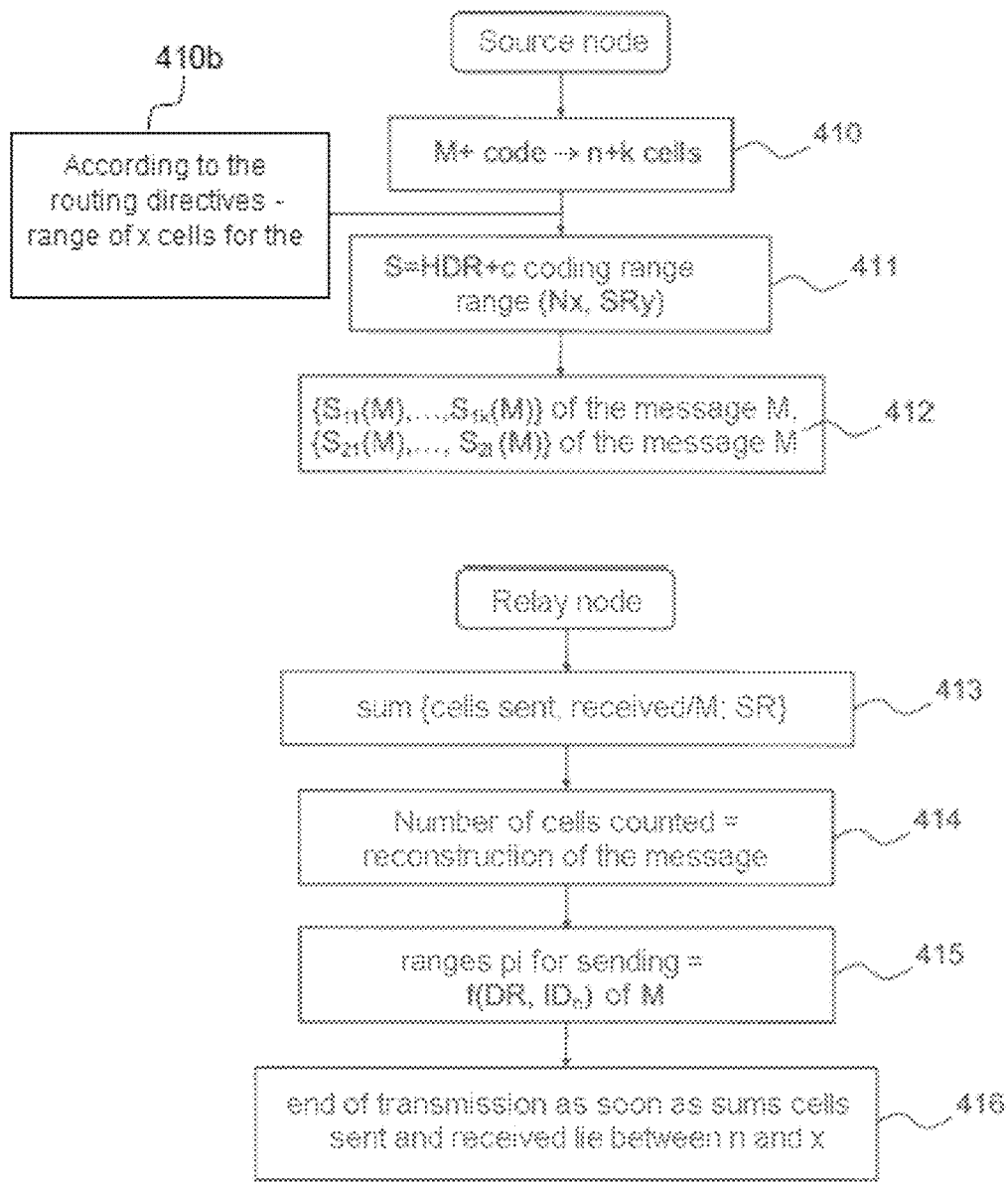
Figure 8:
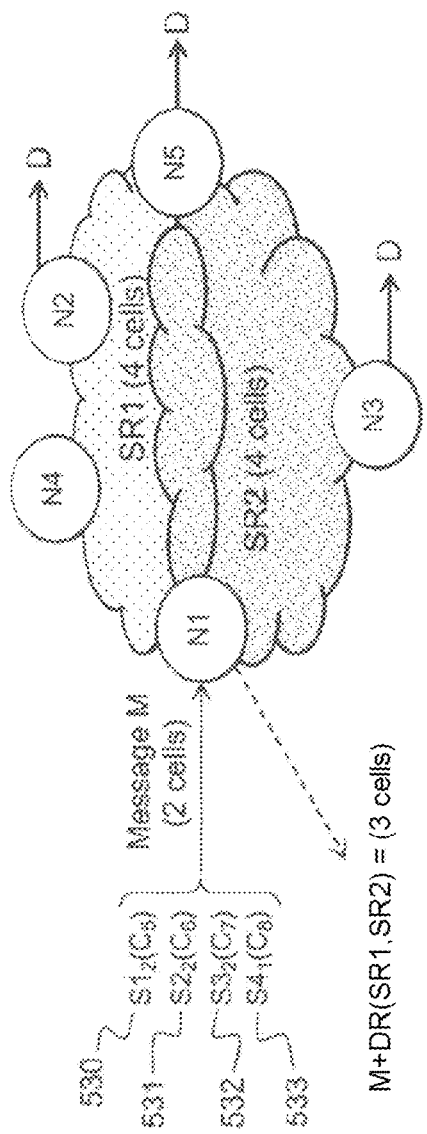

The topology of FIG. 3 also makes it possible to ensure progressive compensation of losses. The losses are erased gradually in one and the same sub-network, as illustrated in FIG. 8:

The nodes N2 and N4 are not accessible, sending of the message M to the nodes N3, N5 on the sub-network SR2 only, The error rate of the node N5 is more significant than that of the node N3, The node N1 sends the segment $S1_2(C_5)$ on the sub-network SR2, N3, N5, 530, The node N1 sends $S2_2(C_6)$ on SR2, N3, N5, 531, The node N1 sends $S3_2(C_7)$ on SR2, N3 receives, N5 does not, 532, The node N1 sends $S4_2(C_8)$ on SR2, N3, N5 do not receive, 533, The node N3 has three cells at its disposal, it reconstructs the message so as to deliver it to the recipient, 534

The node N3 sends $S3_2(C_{21})$ on SR2, N1 and N5 receive, 535,

The node N5 has three cells at its disposal, it can reconstruct the message (by virtue of N3) and deliver the message to the recipient, 536, The node N5 sends a cell on the sub-network SR2 so as to total four cells on the sub-network SR2, 537.

Figure 9:
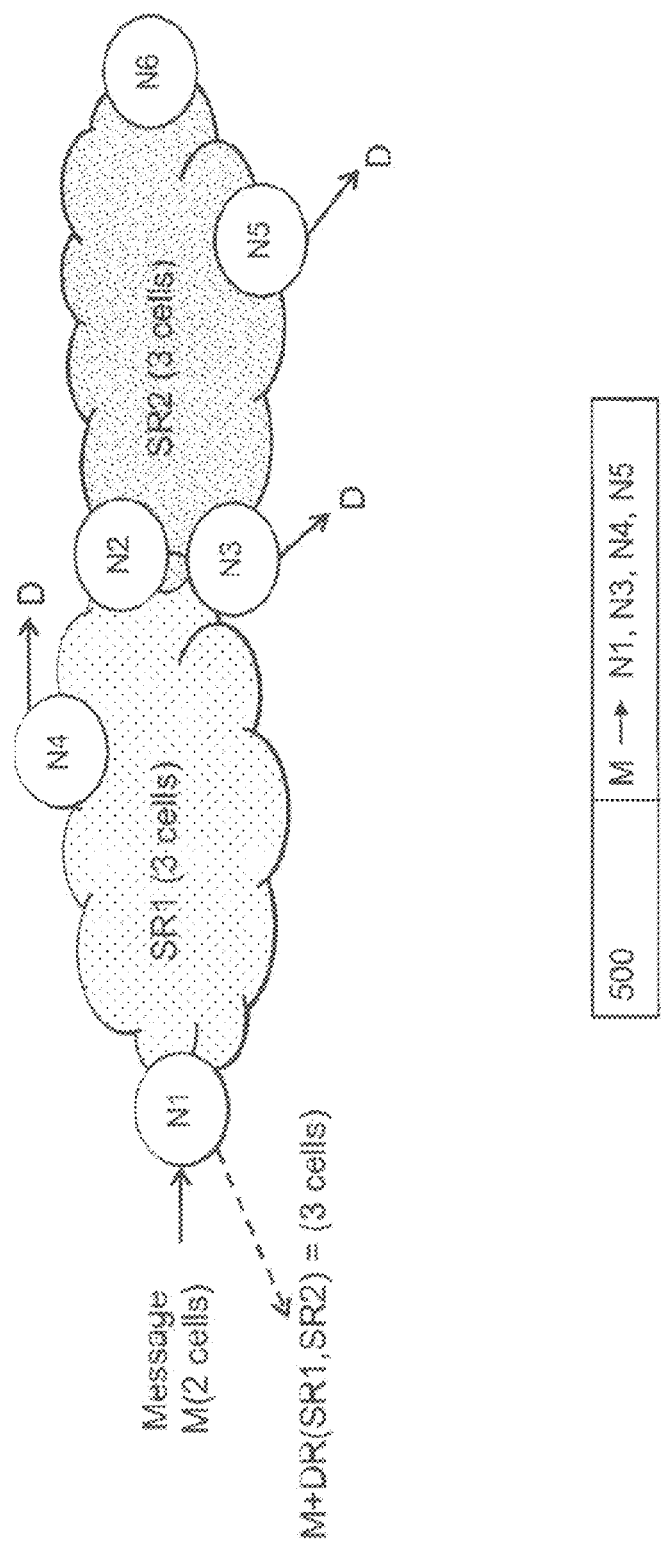

FIG. 9 represents a second exemplary network topography for the implementation of the method according to the invention. The message M is transmitted by the source node N1 to the nodes N3, N4, N5 belonging to the same group G, 500:

Message Size=20 bytes,

Routing directive=SR1, SR2, Routing directive Size=10 bytes,

Number of cells per segment: one for SR1, one for SR2,

Cell size=10 bytes, 3 cells Range (SR1), 3 cells Range (SR2), x=3 cells per range, Ranges: p(N1,SR1)=1, p(N1,SR2)=2, p(N2,SR1)=3, p(N2,SR2)=4, p(N3,SR1)=5, p(N3,SR2)=6, p(N4,SR1)=7, p(N4,SR2)=8, p(N5,SR1)=9, p(N5,SR2)=10, p(N6,SR1)=11, p(N6,SR2)=12.

Figure 10:
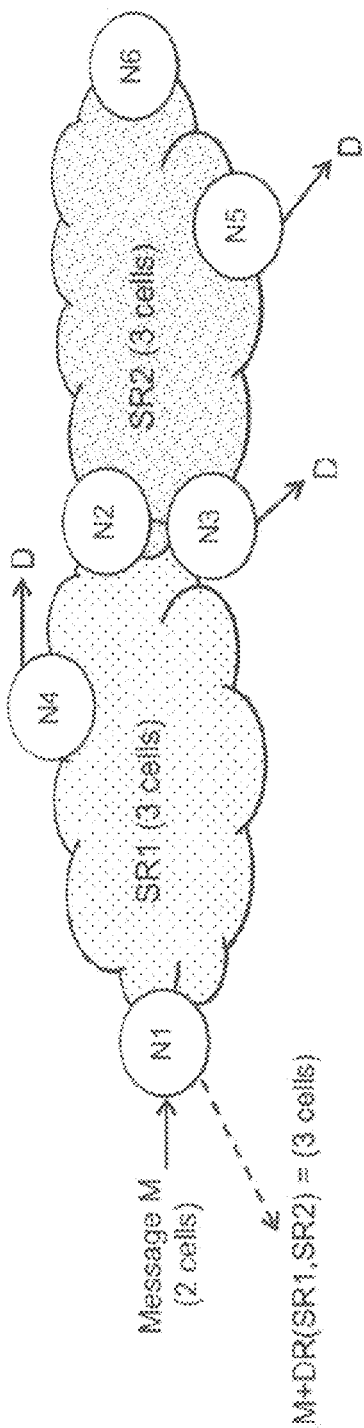

An exemplary range allocation function is the following f(node, sub-network)=(nodeNo.−1)*Number of sub-networks of the routing directive+position of the sub-network in the routing directive. The example of FIG. 10 allows a decrease in multi-path latency. The transmission capabilities of the two relays can be utilized:

The node N1 sends $S1_1(C_1)$ on SR1, all the nodes receive, 550,

The node N1 sends $S2_1(C_2)$ on SR1, all the nodes receive, 551,

The node N1 sends $S3_1(C_3)$ on SR1, all the nodes receive, 552,

The nodes N2, N3 reconstruct the message, N3 returns it to its recipient (N2 does not since it is not in the group), 553, The node N2 sends $S1_2(C_{10})$ on SR2, all the nodes of SR2 receive, 554, The node N3 sends $S1_2(C_{16})$ on SR2, all the nodes of SR2 receive, 555, The node N3 sends $S2_2(C_{17})$ on SR2, all the nodes of SR2 receive, 556, The node N5 reconstructs the message, the sending capabilities of the two relays have been utilized, 557.

Figure 11:
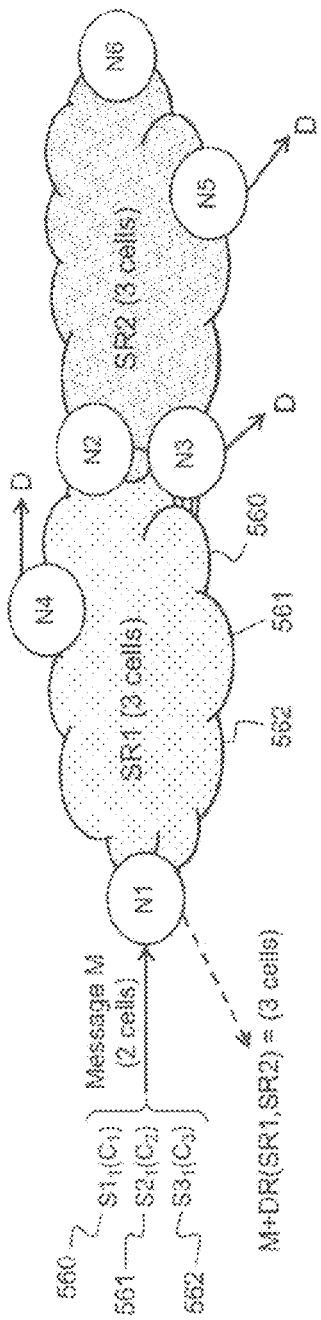

The example which follows, FIG. 11, allows the splitting of radio networks/mobility of nodes. The mechanism remains efficient in case of splitting of networks:

Two partitions of SR1 are constructed (N1, N3) and (N2, N4). They are no longer in radio range, The node N1 sends $S1_1(C_1)$ on SR1, only N3 receives, 560, The node N1 sends $S2_1(C_2)$ on SR1, only N3 receives, 561, The node N1 sends $S3_1(C_3)$ on SR1, only N3 receives, 562, The node N3 reconstructs the message and returns it to the recipient, 563, The node N3 sends $S1_2(C_{16})$ on SR2, all the nodes of SR2 receive, 564, The node N3 sends $S1_2(C_{17})$ on SR2, all the nodes of SR2 receive, 565, The node N3 sends $S2_2(C_{18})$ on SR2, all the nodes of SR2 receive, 566, The nodes N2, N5 reconstruct the message, N5 returns it to the recipient, N2 has not yet received any information on SR1, it transmits the message on SR1, 567, The node N2 sends $S1_1(C_7)$ on SR1, only N4 receives, 568, The node N2 sends $S2_1(C_8)$ on SR1, only N4 receives, 569, The node N2 sends $S3_1(C_9)$ on SR1, only N4 receives, 570, The node N4 reconstructs the message and returns it to the recipient, 571.

The method according to the invention also applies to internet networks with IP protocol. If SR1 is a radio network and SR2 an IP (not necessarily radio) sub-network, the mechanism is applied in the following manner:

On the sub-network SR1:

The identifier of the sub-network in the routing directive is a radio network,

Broadcasting on the radio network of the segments (BROADCAST Radio),

On the sub-network SR2:

The identifier of the sub-network in the routing directive is an IP sub-network, Broadcasting on the IP network of the segments using a MULTICAST group dedicated to this type of forwarding (the receivers are listening on this MULTICAST group).

The method according to the invention makes it possible, in particular, to ensure transmission of the messages with an optimal latency owing to the use of all the available resources by relying on several networks and/or several relays between two networks and by using cells of different indices and which make it possible to avoid sending cells of the same index, doubletons, which do not make it possible to reconstruct a message.

The fact of not sending the same cell several times allows a receiver node of the system to reconstruct the initial message with n cells, n corresponding to the initial size of the message.

The size of the segment depends in particular on the characteristics of the various networks involved in the transmission of the data, radio, etc.

The coding of the message is based on a fountain code common to the source and to all the relays guaranteeing the linear independence of all the resulting segments. This code guarantees to any receiver belonging to a group that it can reconstruct the message as soon as it receives the number of cells of different index that is sufficient to decode the message.

The coding algorithm is an algorithm exhibiting in particular the feature of coding a message and of producing a string of n+k cells indexed in such a way that, on the basis of n cells of different index and whatever their content, it is possible to reconstruct the original message.

The coding algorithm is for example an algebraic code which guarantees that no item of information will be needlessly repeated.

The monitoring information is reduced in its nominal mode of operation to the routing directive inserted into the message reduced to a list of the networks to be followed and to the headers of segments. Modes of operation with acknowledgements will comprise additional monitoring information exchanges.

The method according to the invention can be implemented in a radio transmission system using VHF and UHF waveforms, with intermittent operation for UHF. It can also be used in a system where UHF transmission is not available, the recipient will then receive the message via the VHF sub-network.

The method and the system according to the invention offer in particular the following advantages:
A reduction in transmission latency,
A limited overhead (monitoring information),
Global efficiency of the resources used,
Effectiveness for messages of small size or significant size,
Resilience, i.e, a robustness in relation to intermittent losses of data and of connectivity.

The invention claimed is:

1. A method for transmitting a message M sent by a source node toward at least a recipient node, within a group of nodes each linked to one or more broadcasting sub-networks, said group of nodes sharing topology view via a routing protocol, said source and recipient nodes communicating via broadcast transmissions and relay nodes configured to receive information of sub-networks and to relay the information toward sub-networks according to routing directives of the source node, the message M comprising n cells and information specific to the routing wherein: at the level of the source node:
choosing a coding of the cells of the message M and of the information specific to the routing, by the source node by using a fountain code adapted for generating n+k cells, so as to constitute p ranges of x cells, with x greater than or equal to n, a cell being tagged by an index in the message M,
as a function of routing directives and of its identifier IDn, the source node determines the ranges of x cells to be used to code the message M before the sending to the relay node or nodes or to the recipient node or nodes,
the source node groups together the cells to be transmitted into several segments, a segment comprises a number Ns of coded cells and the source node inserts before each segment a header comprising at least the following information: an item of information making it possible to deduce the index of each cell contained in the segment, an identifier specific to the message M to be transmitted and its size,
sending at least one first string of segments $\{S_{11}(M), \ldots, S_{1K}(M)\}$ of the message M via a first transmission path and at least one second string of segments $\{S_{21}(M), \ldots, S_{21}(M)\}$ of the message M via a second transmission path, at the level of a relay node:
the relay node keeps count per message M and per sub-network SR of the cells of different indices that it sends and that it receives from the other nodes of one sub-network SR, on the basis of the message identifier contained in the segment header,
as soon as the relay node has at its disposal a number of cells of different indices corresponding to the size of the message M, it reconstructs this message M,
as a function of the routing directives contained in the reconstructed message M and of its node identifier IDn, the relay node determines the ranges of x cells to be used to recode the message M before the sending to the other relay nodes or to the other recipient nodes, and sends on each sub-network a maximum number of cells while taking account of the cells that it has already received on this sub-network,
the relay node stops its sending on the sub-network SR as soon as the number of cells of different indices received and sent on the sub-network makes it possible to reconstruct the message M from the other nodes of the sub-network under the assumption of nominal reception,
the recipient nodes belonging to the group of linked nodes and which are not relay nodes reconstruct the message M on the basis of segments received from the sub-networks to which they are attached before delivering the message M.

2. The method according to claim 1, wherein the algorithm for coding the cells is an algebraic code.

3. The method according to claim 1, wherein the number of cells is chosen as a function of the characteristics of the sub-network for transmitting the message M.

4. The method according to claim 1, wherein the number of cells to be transmitted on a sub-network corresponds to the number adapted for the error rate of the transmission sub-network.

5. The method according to claim 1, wherein a source node uses a function for allocating range of cells to be sent which is adapted for allocating a different range to each (node, sub-network) pair, the sub-networks to be considered being the sub-networks of the routing directive.

6. The method according to claim 1, wherein the controlling of the transmission of the segments takes account of a reception state item of information delivered by the receivers.

7. The method according to claim 1, wherein the transmission of the data is carried out by high-frequency transmission and/or very-high-frequency transmission and/or all IP network transmission.

8. A system for relaying one or more messages within a network comprising several nodes communicating with one another by means of a broadcasting medium, and belonging to a group G, which comprises a source node and several nodes of the network, a message M being composed of several cells, a cell being identified by an integer index representing the order number of this cell produced by a fountain code, comprising at least the following elements:
a source node of the message M to be transmitted on several paths corresponding to at least two sub-networks, the source node comprising at least one emitter and one processor adapted for executing the steps of the method at a source node according to claim 1, a coding algorithm for the data of the message M to be transmitted, one or more relay nodes each comprising a sender, a receiver, a coding/decoding algorithm for the message M identical to the algorithm for coding the transmitted message M, a counter of the cells contained in the coded message M that are sent and received per forwarding path of the message M, the coding/decoding algorithm being adapted for the recombining of elements transmitted on various sub-networks, a receiver adapted for receiving the message M sent by the source node, a processor adapted for reconstructing the message M, one processor adapted for executing the steps of the method at a relay node according to claim 1, a destination node comprising one receiver of the message M, a decoding algorithm module for reconstituting the message M, one transmitter and one processor configured to reconstruct the message M to from the segments received from the sub-networks to which they are attached, a counter for counting the cells sent and received by a routing path of the message M.

\* \* \* \* \*